United States Patent [19]

Heins

[11] Patent Number: 4,482,377
[45] Date of Patent: Nov. 13, 1984

[54] SEPARATION OF ZINC FROM A ZINC-COPPER ALLOY

[75] Inventor: Sidney M. Heins, Chicago, Ill.

[73] Assignee: Chempro Corporation, Chicago, Ill.

[21] Appl. No.: 485,209

[22] Filed: Apr. 15, 1983

[51] Int. Cl.³ .................. C22B 19/20; C22B 15/08
[52] U.S. Cl. ........................... 75/101 R; 75/115; 75/117; 75/120; 423/41; 423/109
[58] Field of Search ............. 423/106, 105, 109, 104, 423/520, 544, 622, 27, 41, 45; 75/101 R, 115, 117, 120, 109

[56] References Cited

U.S. PATENT DOCUMENTS

| | | | |
|---|---|---|---|
| 1,374 | 0/1891 | Clark | 423/106 |
| 1,579,302 | 4/1926 | Gidden et al. | 423/105 |
| 1,912,332 | 5/1933 | Steinbring | 423/104 |
| 3,905,808 | 9/1975 | Bzura | 423/41 |
| 4,149,945 | 4/1979 | Kust | 75/120 |

Primary Examiner—John Doll
Assistant Examiner—Robert L. Stoll
Attorney, Agent, or Firm—Gerlach & O'Brien

[57] ABSTRACT

Zinc is separated from a zinc-copper alloy, in particular, brass scrap, by reacting the alloy with an aqueous alkali metal bisulfate to dissolve zinc selectively with respect to copper. Zinc is recovered from the resulting solution by precipitation in the form of an insoluble zinc compound, namely, zinc carbonate or zinc hydroxide.

2 Claims, No Drawings

SEPARATION OF ZINC FROM A ZINC-COPPER ALLOY

BACKGROUND OF THE INVENTION

This invention relates to the recovery of metal values from non-ferrous alloys, more particularly to the separation of zinc from zinc-copper alloys such as brass. The invention is especially useful for reclaiming zinc from brass scrap.

Significant quantities of scrap are produced as by-products of the manufacture of virgin brass, and as waste metal formed during the fabrication of brass articles. This scrap, as such, has little economic worth. Consequently, economic processes have been sought for salvaging the metal values of the scrap for reuse.

One process for recovering the metal values from brass scrap involves the high temperature distillation of zinc therefrom, as disclosed, for example, in U.S. Pat. No. 2,429,584. Other processes utilize chemical treatments of the scrap. Thus, for example, brass scrap may be treated with chlorine or chlorine-containing compounds to produce zinc chloride and cuprous chloride, as disclosed in U.S. Pat. No. 1,402,015. Another chemical treatment of brass scrap includes an initial reaction with an ammoniacal solution, followed by a reaction with caustic alkali to give, as end products, copper oxide and zinc carbonate, as disclosed in U.S. Pat. No. 2,912,305.

The high temperature distillation processes separate zinc from copper in one step. However, these processes require substantial capital outlays for suitable high temperature distillation apparatus and have relatively large operating costs, due to the need for heating the scrap to the temperature of 1,665° F., (907° C.) or higher, for the distillation of zinc at atmospheric pressure. Accessory equipment often is needed to keep the amount of polluting effluents from the distillation within the limits defined by air and water-pollution control regulations.

Chemical processes for the recovery of zinc and copper values from brass are generally carried out at a low temperature relative to the zinc-distillation methods, and thus generally have lower capital and operating costs relative thereto. However, chemical processes often involve a first step of completely dissolving all of the metal constituents of the brass in a suitable reagent, thus giving a solution containing both zinc and copper. Multiple succeeding process steps then are necessary to substantially completely separate the two metals and to obtain one or both metals in metallic form. Also, chemical processes utilizing for their operation ammoniacal solutions or strong mineral acids, or chlorine, require expenditures for the control of toxic gaseous and/or liquid process effluents. Processes utilizing strong acid reagents also may require expensive corrosion-resistant apparatus.

SUMMARY OF THE INVENTION

The present invention provides a chemical process for separating zinc from zinc-copper alloys, which avoids the expenses associated with high temperature distillations, enables recovery of the zinc in the form of a commercially useful compound in a minimum of process steps, and is well-adapted for minimizing the output of polluting effluents.

In accordance with the invention, zinc is separated from a zinc-copper alloy by reacting the alloy with an aqueous alkali metal bisulfate to dissolve zinc selectively with respect to copper. The zinc preferably is recovered from the resulting solution by precipitation in the form of an insoluble zinc compound. The solid residue remaining undissolved after the reaction with bisulfate contains the copper present in the alloy, in relatively concentrated form.

The zinc dissolved from the alloy may be accompanied by contaminants in the form of dissolved metals lower than zinc in the electromotive series of the elements. Such metals may be removed in accordance with a preferred embodiment of the invention, by admixing zinc metal with the reaction solution to precipitate the metals by displacement reactions, and separating the precipitate from the solution, prior to precipitation of the insoluble zinc compound.

DESCRIPTION OF THE PREFERRED EMBODIMENTS

The brass scrap employed as the starting material in the preferred applications of the invention includes such materials as the so-called brass skimmings which are obtained as by-products of the manufacture of brass metal. Other scrap materials include the turnings, grindings, and the like, which accumulate in the manufacture of brass articles. The several materials include alloyed zinc and copper, and may also include minor amounts of other alloyed or adventitious metals, and slag in the skimmings.

The charge to the process preferably is in finely divided form to facilitate reaction. The charge can be in the form of pellets, powder, turnings, grindings, and the like. It is preferred that the charge be of a fineness to permit substantially complete passage through a 20 mesh screen.

The scrap charge is reacted with aqueous alkali metal bisulfate to dissolve zinc while copper remains substantially undissolved. It is preferred that the alkali metal bisulfate be sodium bisulfate. The concentration of the bisulfate solution preferably is a minimum of about 0.22 mole of bisulfate per 100 grams of solution.

The reaction preferably is carried out, with agitation, at atmospheric pressure and at a temperature in the range of about 60° F. to 120° F. To minimize the possibility that copper may dissolve during reaction, it is preferred to avoid excessive aeration of the reaction mixture. The reaction is carried out substantially to completion.

The reaction products include soluble zinc sulfate and an insoluble copper-containing residue, the content of which varies with the source and makeup of the scrap charge. In addition to soluble zinc, the resulting solution may contain minor amounts of other dissolved metals, such as iron, which are present in the charge.

In a preferred embodiment of the invention, when removal of dissolved metals is desirable to minimize product contamination, any dissolved metals lying below zinc in the electromotive series of the elements are precipitated from solution by admixing zinc metal with the reaction solution. Preferably, sufficient zinc metal is admixed with the solution to substantially completely displace any dissolved metal lower than zinc in the electromotive series. The zinc metal preferably is employed in finely divided form, such as in powder form. The displacement reaction preferably is carried out at a temperature of about 100° C.

The undissolved residue and any precipitate of dissolved metals are separated from the solution by conventional means, such as filtration. The residue may be used as a source of copper values, and, for easier handling, may be briquetted.

As an alternative to the removal of dissolved metals prior to the separation of the insoluble residue from the zinc-containing solution, by precipitation with zinc metal, the dissolved metals may be removed following such separation of the residue, by the same method of precipitation, followed by separation of the precipitate, as by filtration. The alternative method of removal precedes the precipitation of zinc compound, described hereinafter, since a principal objective is to minimize contamination of the product compound.

After separation of the residue and any precipitate, the zinc preferably is recovered by precipitation from the separated solution in the form of zinc carbonate. Alternatively, a precipitate of zinc hydroxide may be formed.

Zinc carbonate preferably is formed by admixing a source of carbonate ions or of bicarbonate ions with the separated solution, thereby forming, as is well known in the art, the basic or the normal zinc carbonate, respectively. It is preferred that at least stoichiometric amounts of carbonate ions or of bicarbonate ions be used. An alkali metal carbonate, preferably sodium carbonate, or carbon dioxide preferably is employed as the source of carbonate ions. An alkali metal bicarbonate, preferably sodium bicarbonate, preferably is employed as the source of bicarbonate ions.

The zinc carbonate product, obtained in either of the foregoing ways, is separated from the mother liquor, in a conventional manner, such as by filtration or centrifugation. The solid product preferably is dried by heating at a temperature not exceeding about 100° C. The zinc carbonate can be used as such, or it can be calcined in known manner to form commercially useful zinc oxide.

Alternatively, zinc can be precipitated from the reaction solution by admixing alkali metal hydroxide therewith to form zinc hydroxide. It is preferred that at least a stoichiometric amount of the metal hydroxide be used. Zinc hydroxide readily can be separated from solution by, for example, filtration, and then calcined to form the commercially useful zinc oxide.

The solution or mother liquor remaining after removal of the product contains soluble sulfate, which is sodium sulfate when the preferred sodium compounds are employed as reactants. The sulfate may be recovered for other use, or may be reacted with sulfuric acid to regenerate the bisulfate reactant used in the process. A closed cycle of reagent use is achieved with the latter alternative. Either alternative minimizes the problems of liquid waste disposal.

The new process does not use strong mineral acids or reagents of high vapor pressure, such as ammonia or chlorine, and thus, problems of equipment corrosion and of atmospheric pollution are ameliorated.

The following example illustrates a preferred embodiment of the process of the invention. It will be understood that the invention is not limited to the example, which is merely illustrative, or to the materials, proportions, conditions, and procedures set forth therein. In the example, all parts are by weight.

EXAMPLE

A solution of 75 parts of sodium bisulfate monohydrate, $NaHSO_4 \cdot H_2O$ (reagent grade), in 175 parts of water was prepared (0.22 mole of bisulfate per 100 grams of solution). The pH of this solution was about one. The solution was placed in a vessel equipped with an agitator, and to the vessel was added 50 parts of finely divided brass skimmings; substantially 100 percent of the skimmings passed through a 50 mesh screen. The metal analysis was: copper, 33.84%; zinc, 47.20%; iron, 1.06%. The molar ratio of sodium bisulfate to zinc was 1.5 to 1.

Agitation and mild heating of the reaction mixture was begun. The pH of the resulting solution after about one minute of reaction was about two. The agitation was continued while the reaction mixture was heated to, and held at, a temperature of about 38° C. (100° F.). The agitation at 38° C. was continued for a period of about 3.5 minutes, for a total reaction time of about 5 minutes. The pH of the resulting solution was about three.

The reaction mixture, consisting of undissolved charge and resulting solution, then was heated quickly to about 100° C. Powdered zinc metal then was added, incrementally, to the agitated mixture, and a dark precipitate formed. Incremental addition was continued until no further precipitation was noted.

The mixture next was cooled to about room temperature and then filtered through filter paper. The undissolved portion of the brass skimmings (which included the dark precipitate described hereinabove) was isolated, as was also the filtrate, or separated solution. The filtrate was agitated, at about room temperature, and admixed with incrementally added portions of aqueous 25 weight percent sodium carbonate. A light-colored precipitate of zinc carbonate formed. Incremental addition of the aqueous sodium carbonate was continued until no further precipitate was seen. The precipitated zinc carbonate then was filtered from the remaining solution.

The undissolved portion, which included the abovedescribed dark precipitate, and the zinc carbonate were dried for a period of about one-half hour at a temperature of about 100° C. Thirty-three parts of undissolved portion-plus-dark precipitate, and 17 parts of zinc carbonate were obtained. The presence of magnetically-attracted material in the isolated undissolved portion was shown by passing a magnet closely thereover and noting the adherence to the magnet of dark material

I claim:

1. In a process for recovering zinc from a zinc-copper alloy, the step which consists essentially of reacting the alloy in the form of particles passing through a 20-mesh screen with an aqueous alkali metal bisulfate solution in a concentration of at least about 0.22 mole of said bisulfate per 100 grams of solution, at a temperature of about 60° F. to 120° F., for a period of time of about 5 minutes and at a pH of about 1 to 3, to dissolve zinc from the alloy and leave an undissolved residue containing the copper which was present in the alloy.

2. A process as defined in claim 1 wherein said alloy is brass.

* * * * *